United States Patent [19]

McBride

[11] Patent Number: 5,619,395
[45] Date of Patent: Apr. 8, 1997

[54] DEVICE FOR ATTACHING A WIRELESS TELEPHONE TO A PORTABLE COMPUTER

[76] Inventor: Jon McBride, 2676 E. Colmere, Sandy, Utah 84092

[21] Appl. No.: 428,462

[22] Filed: Apr. 25, 1995

[51] Int. Cl.$^6$ .............................. G06F 1/16; H04M 1/06; A47G 29/00
[52] U.S. Cl. ......................... 361/683; 361/681; 361/686; 248/214; 248/220.22; 248/674; 248/692; 248/918; 379/446
[58] Field of Search .............................. 248/214, 220.22, 248/224.8, 674, 675, 918, 689–692; 364/708.1; 361/679–687; 379/446

[56] References Cited

U.S. PATENT DOCUMENTS

| | | |
|---|---|---|
| D. 294,025 | 2/1988 | Boykiw . |
| 2,586,740 | 2/1952 | Swanson . |
| 2,863,954 | 12/1958 | Renneker . |
| 3,294,229 | 12/1966 | McConnell et al. . |
| 3,309,052 | 3/1967 | Borisof . |
| 3,315,325 | 4/1967 | Cornelius . |
| 3,491,971 | 1/1970 | Fisher . |
| 3,516,631 | 6/1970 | Santucci . |
| 3,578,282 | 5/1971 | Olsen .................................. 248/214 |
| 3,582,574 | 6/1971 | Grau . |
| 3,631,568 | 1/1972 | Wolfe et al. . |
| 4,609,785 | 9/1986 | Drinkard et al. . |
| 4,771,927 | 9/1988 | Ventura . |
| 4,850,557 | 7/1989 | Valiulis .............................. 248/220.22 |
| 4,915,215 | 4/1990 | Brekke . |
| 4,961,223 | 10/1990 | Sutton . |
| 5,020,090 | 5/1991 | Morris ...................................... 379/58 |
| 5,056,197 | 10/1991 | Cohen . |
| 5,131,036 | 7/1992 | Dunchock . |
| 5,178,354 | 1/1993 | Engvall . |
| 5,253,292 | 10/1993 | Fluder et al. . |
| 5,259,028 | 11/1993 | Westbrook .............................. 379/455 |
| 5,295,649 | 3/1994 | Lee . |
| 5,331,721 | 7/1994 | Raum, Sr. . |
| 5,371,791 | 12/1994 | Schwartz et al. . |
| 5,456,046 | 10/1995 | Vitalune et al. ..................... 248/214 X |

Primary Examiner—Michael W. Phillips
Attorney, Agent, or Firm—Knobbe, Martens, Olson & Bear, LLP

[57] ABSTRACT

A phone/computer combination, in which a portable computer having a generally vertical lid or screen has a wireless phone removably attached thereto such that the phone is maintained in a generally vertical orientation. The wireless phone includes a clip which mates into a clip holder on the portable computer lid.

10 Claims, 4 Drawing Sheets

DEVICE FOR ATTACHING A WIRELESS TELEPHONE TO A PORTABLE COMPUTER

FIELD OF THE INVENTION

This invention relates to a phone/computer combination, with a computer that supports a wireless telephone in a vertical position.

BACKGROUND OF THE INVENTION

Portable computer users often find the need to take advantage of the telecommunications functions that are available through their computers. These features allow such useful tasks as checking office e-mail, faxing a document, or transferring a file. A convenient method of accessing these features while away from a standard telephone outlet is the use of a wireless telephone. Many specialized cables and circuit boards currently exist that allow a wireless telephone to interface with the communications port of a portable computer. In cellular data transmission, strong reception and transmission of a cellular signal is essential to proper communications.

To maximize the reception and transmission of a cellular signal, the antenna of a wireless telephone should to be oriented in essentially the vertical position. This permits a more efficient transmission and reception of the cellular signal and therefore more reliable data transmission from a computer. Currently, there are no known devices that conveniently support a wireless telephone upright while using a portable computer so the antenna remains in the vertical position. Consequently, most portable computer users rest the wireless telephone in a horizontal position while the telephone interfaces with the computer's communications port. This leads to inefficient reception and transmission on the cellular network, thereby increasing data transmission time or making such transmissions impossible.

Additionally, portable computer users often find themselves operating their computers in limited amounts of space, such as in their car, on a bus or a train. Because of space limitations, finding a convenient place to rest the wireless telephone while it is hooked up to a portable computer would be very advantageous.

Patents relating to supporting telephones are U.S. Pat. No. 5,295,649, dated Mar. 22, 1994 to R. Lee, U.S. Pat. No. 3,582,574, dated Jun. 1, 1971 to M. Grau, and U.S. Pat. No. 2,863,954, dated Dec. 9, 1958 to H. Renneker. While these patents all relate to supporting telephone receivers, none describe a device to be used to hold a portable telephone in a vertical position next to a portable computer.

The Lee patent discloses a support for a one-piece telephone that attaches to a hospital bed. The support is composed of a single piece of plastic designed to hold an angled, one-piece telephone over the rails of a hospital bed. This device only works with telephones of specific shapes, and can only be used on a set of rails, such as those found on hospital beds. No method was available to attach such a device to a portable computer. Also, the Lee device was designed to store telephones when not in use.

In the Grau and Renneker patents, telephone handset supports are disclosed for supporting the handset on a user's shoulder for stable handsfree operation of the telephone. There is no mechanism discussed that allows vertical support of the telephone. The only disclosure is for support on the human shoulder, and not on an external device such as a portable computer.

Other patents have related to cellular telephone supports. Examples of some patents are U.S. Pat. No. 5,131,036, dated Jul. 14, 1992 to R. Dunchock, U.S. Pat. No. 5,253,292, dated Oct. 12, 1993 to E. Fluder and U.S. Pat. No. 4,961,223, dated Oct. 2, 1990 to B. Sutton. None of these patents are directed to mounting a wireless telephone in a vertical position on a portable computer.

The Dunchock patent discloses a telephone supporting device that mounts on an automobile center console. This supporting device was designed so that it may be mounted without the use of screws or bolts. Because of this feature, it was also easily removed from the center console. However, this device is specific to an automobile center console and cannot be used on a portable computer. Also, this supporting device does not support the telephone in the vertical position, and is not designed to support the wireless telephone while in use.

In the Fluder patent, a cellular telephone carrier assembly was disclosed that had a clipping mechanism to attach to articles such as clothing. A frame attached to the clipping mechanism to secure the telephone to the clip. This frame was contoured to the shape of the cellular telephone, and therefore differed for each telephone design. Also, the bulk added by the frame made this design less portable and more costly. A simple, less bulky attachment mechanism is needed that can support the telephone in the vertical position.

The Sutton patent Gescribed a device that is similar to devices in the Grau and Renneker patents above in that it disclosed a device to allow or stable handsfree operation of a telephone using a shoulder support. However, the Sutton product is designed for use with cellular telephones. In the Sutton patent, there is no disclosure of a mechanism to allow vertical support of a telephone. The only disclosure is for support on the human shoulder, and not on an external device such as a portable computer.

While several telephone support devices are available in the prior art, none aglow vertical support of a wireless telephone onto a portable computer. None of the prior art is designed to specifically attach to a portable computer. Consequently, what is needed in the art is a simple technique for computer users to attach their wireless telephones to portable computers, while maintaining the antenna in a vertical position. Also, a small, low-profile design would advantageously provide maximum portability and low cost.

SUMMARY OF THE INVENTION

The present invention is a device that allows attachment of a wireless telephone to a computer, preferably a portable computer. According to one preferred embodiment of this invention, the user of a computer can attach a device to a portable computer. A wireless telephone can then be attached to the device. The device secures the wireless telephone to the portable computer in a vertical position. The wireless telephone can be interfaced with the portable computer by any standard means available, although it is usually through a communications port on the computer. Any means of connecting the portable computer to the wireless telephone is envisioned in this invention. While the invention is perceived to be used most often with cellular telephones, any wireless telephone such as a portable household phone or a broad spectrum phone may be used.

Maintaining the wireless telephone in a vertical position provides several advantages. First, as previously stated, the transmission and reception of the cellular signal is maximized when the antenna of a wireless telephone is in essentially the vertical position. With the antenna in the vertical position, a cellular telephones' transmission and reception can improve by up to 40 percent. This increased reception and transmission is especially important in cellular data exchange through a portable computer and modem. While poor transmission and reception of a cellular signal during a voice call can cause static and decrease sound quality of a call, the conversation can usually continue. However, during data transfer, the noise introduced into a telephone signal can damage the data packets being sent between the remote portable computer and its host system. This noise on the telephone line may create errors in communication protocols, requiring retransmission or inaccurate transmission of data packets. Moreover, continual retransmission of data packets can significantly increase the time required to complete a file transfer, and may make such a transfer impossible.

Another advantage to a vertically positioned wireless telephone is that it allows easy access of the telephone controls to the user. By using the device of the present invention to mount a wireless telephone vertically on a computer, the telephones' controls and display are easily viewed by the operator. Call progress and information can be monitored from an easy review of the telephone's display. To place a call, the telephone's controls are positioned directly in front of the operator.

Another unique feature of one embodiment of this invention is the low profile that the device possesses when attached to the portable computer. One popular feature of portable computers is their small size. Adding a bulky peripheral device decreases the advantage many people enjoy from owning a portable computer. This preferred design adds very little bulk.

One embodiment of the present invention is a computer/phone combination. This computer portion of the combination includes a portable computer having a base and a lid, wherein the lid is opened into a generally vertical orientation while the base remains generally horizontal. In addition, the phone portion of the combination includes a wireless phone having a front and a back and an antenna, wherein the back of the phone is removably attached to and supported by the vertical lid of the computer in an upright manner so that the antenna extends vertically from the phone. In this combination, the back of the phone can include a clip and the lid of the computer includes a slot into which the clip is inserted. Alternatively, the back of the phone can include a clip and a clip-holder can be mounted onto the lid of the computer wherein the clip holder includes a slot into which said clip is inserted. The combination of the clip and clip holder keeps the phone in a generally vertical position while the lid of the computer is open.

It is anticipated that the phone/computer combination discussed above can be held together by hook and pile fasteners or a strap. Moreover, the phone discussed above can be a cellular phone, a broad spectrum phone, or a portable household phone. Additionally, it is anticipated that the phone and the computer can be linked by a data transmission line known to those of ordinary skill in the art.

In another embodiment of the present invention, the back of the phone includes a clip and a clip holder is mounted horizontally to the side of said the lid and wherein said clip holder has a slot into which said clip is inserted such that the antenna of said phone is positioned in a generally vertical direction.

DETAILED DESCRIPTION OF THE PREFERRED EMBODIMENTS

The present invention involves attachment of computers to wireless telephones so that the telephone remains positioned in roughly the vertical position with respect to the computer. This maintains the antenna of the wireless telephone essentially vertical, thereby improving the telephone's signal transmission and reception. Although described with a portable computer, the invention can include a non-portable computer as one element of the combination.

Figure 1:
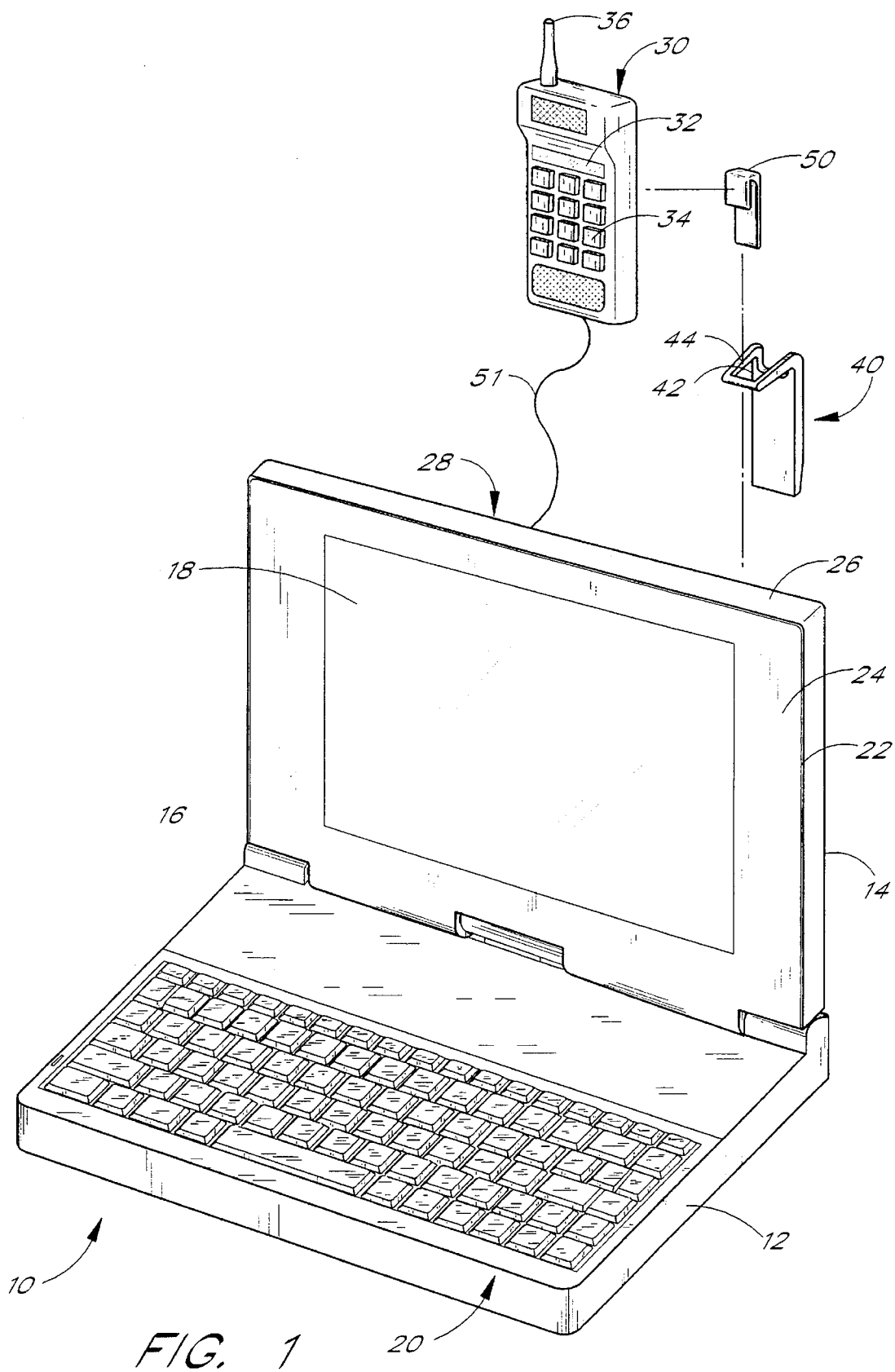
FIG. 1 is an exploded, perspective view of the clip-holder assembly of the present invention together with a wireless telephone and a portable computer.

FIG. 1 illustrates a typical portable computer 10 with a base 12 and lid 14. The lid 14 is attached to the base 12 via a hinge 16 disposed between the base 12 and lid 14. The hinge 16 allows the lid 14 to rotate in from a closed position essentially parallel to the base to an open position essentially 90° to the base. A display screen 18 is mounted inside the lid 14 for displaying data and instructions from the portable computer 10.

As shown in the exploded view of FIG. 1, a wireless telephone 30 is adhesively attached to a "U" shaped clip 50. While a preferred embodiment of the clip 50 is The Clip™ (The Clip, Inc., La Mesa, Calif.), other similar devices are anticipated. For example, hooks, straps and other devices made of plastic, thermoplastic, metal, or wood that function in a manner smmiiar to the clip 50 shown in FIG. 1 are anticipated.

As shown in the exploded view of FIG. 1, the clip 50 slides into a clip-holder 40 which is mounted onto the lid 14 of the portable computer 10. The preferred embodiment of the clip-holder 40 is "L" shaped and rests against the rear side 28 of the lid 14 and the upper side 26 of the lid 14. Once a clip 50 is attached to the wireless telephone 30, it can be slidably inserted into the clip-holder 40 through an opening 42. Thus, the wireless telephone 30 attaches in an upright position to the computer 10 by slidably engaging the clip 50 through the opening 42 in the clip-holder 40. The wireless telephone 30 is in communication with the portable computer 10 through a data communication line 51. The data communication line 51 attaches from the wireless telephone 30 to a communication port (not shown) on the portable computer 10.

The wireless telephone 30 is attached to the lid 14 so as to not cover any portion of the display screen 18. The user of the portable computer 10 receives data and instructions from the computer 10 via the display screen 18, therefore all portions of the screen must remain visible. The lid 14 of the portable computer contains a screen frame 24, which is the area between the display screen 18 and the side edge 22 of the lid 14. The clip-holder 40 will be mounted to the lid 14 so when the wireless telephone 30 is attached, the telephone 30 will only cover the screen frame 24. This allows the user to access the wireless telephone 30 while maintaining full view of the display screen 18.

When the clip-holder 40 is mounted on the lid 14 of the portable computer 10, the lid 14 can still rotate to a closed position, essentially parallel to the base 12. With the lid 14 in the closed position, the upper side 26 of the lid 14 becomes proximate the front edge 20 of the base 12. The top flange 44 of the clip-holder 40 will extend across both the upper side 26 of the lid14 and the front edge 20 of the base 12. This allows the lid 14 to be opened and closed with the clip-holder 40 attached, When the lid 14 is rotated back to the open position, the clip-holder 40 is ready to slidably receive the wireless telephone 30.

In the preferred embodiment, the clip 50 is shown attached to the wireless telephone 30. Of course, any method of attaching the wireless telephone 30 to the lid 14 of the portable computer 10, such as with a strap or hook-and-loop strips, would achieve essentially the same result and not depart from the spirit of the invention.

By inserting the clip 50 through the opening 42 in the clip-holder 40, the wireless telephone 30 remains in the upright position when attached to the lid 14 of the portable computer 10. By remaining upright, the wireless telephone 30 gains many advantages. First, the antenna 36 remains essentially vertical, thereby improving the transmission and reception ability of the wireless telephone 30. Also, because the wireless telephone 30 is mounted on the lid 14, the user can easily see the display 32 of the wireless telephone 30. This enables the user to monitor the progress of a call by reerring to the display 32. Finally, the wireless telephone's controls 34 are located immediately forward of the lid 14 for easy operation of the wireless telephone 30. Calls may be placed or received without having to remove the wireless telephone 30 from the lid 14.

Figure 2:
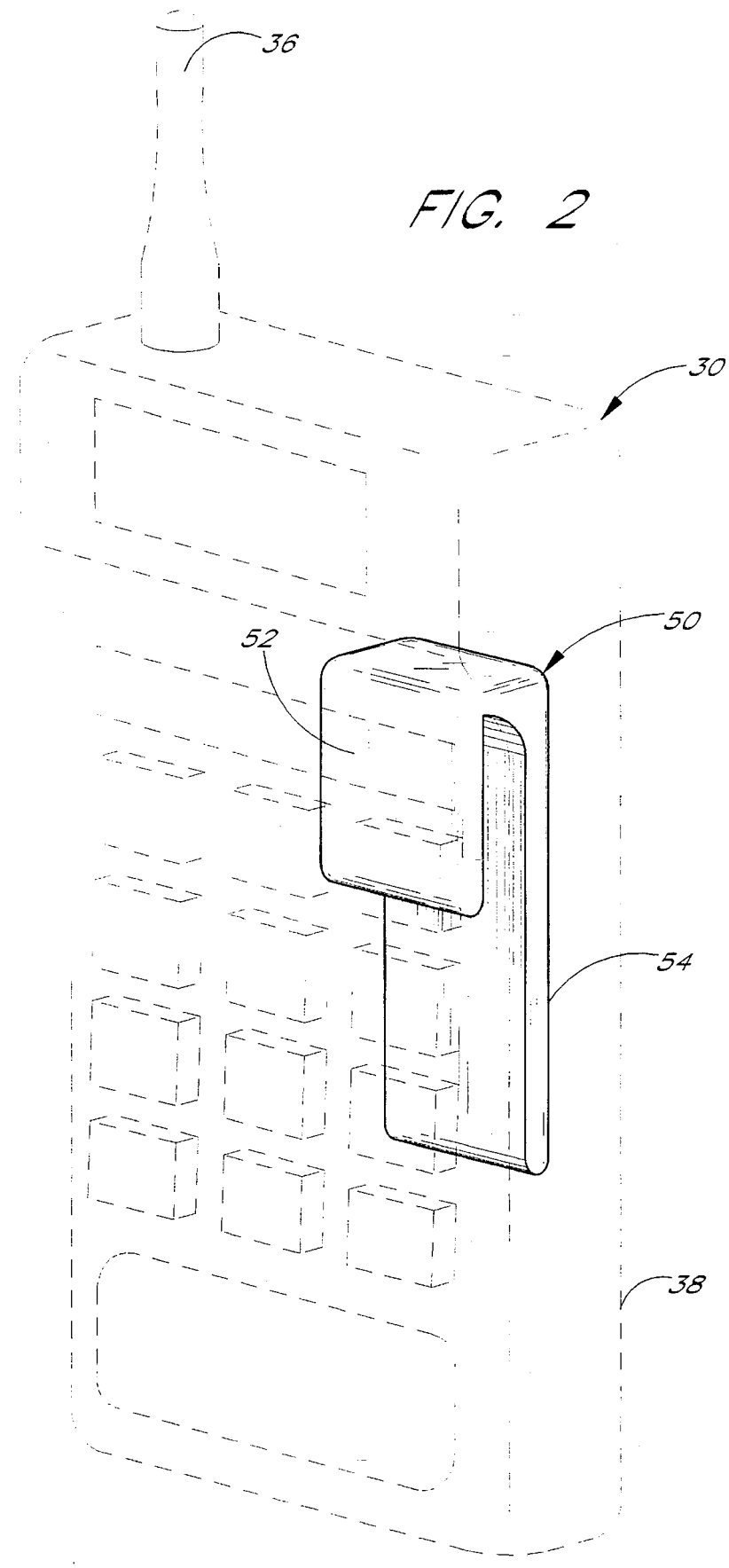
FIG. 2 is a perspective view of The Clip™ attached to a wireless telephone.

FIG. 2 shows the clip 50 attached to the wireless telephone 30. The front surface 52 of the clip 50 is secured to the rear case 38 of the wireless telephone 30. The front surface 52 can be attached by any number of methods. In the preferred embodiment, a dual-sided acrylic bonding adhesive strip is applied to the front surface 52 of the clip 50 and on the rear case 38 of the wireless telephone 30. However, alternative methods of attachment, such as glue or hook and pile or hook and loop fasteners, may be used without altering the spirit of the invention. In addition, a protective cover may be placed over the telephone wherein a clip is affixed to the cover. In this manner, the telephone is secured to the computer in a vertical position via the clip on the back of the cover.

When the clip 50 is attached to the wireless telephone 30, the tongue 54 of the clip 50 is available to mount the wireless telephone 30 in the clip-holder 40. The clip 50 may be mounted at any location along the rear case 38 of the wireless telephone 30. Selection of a location will vary depending on both the size of the wireless telephone 30 and the width of the screen frame 24 (FIG. 1). The location to mount the clip 50 should be selected so when the tongue 54 of the clip 50 is inserted through the opening 42 of the clip-holder 40, no part of the telephone 30 covers the display screen 18.

Figure 3:
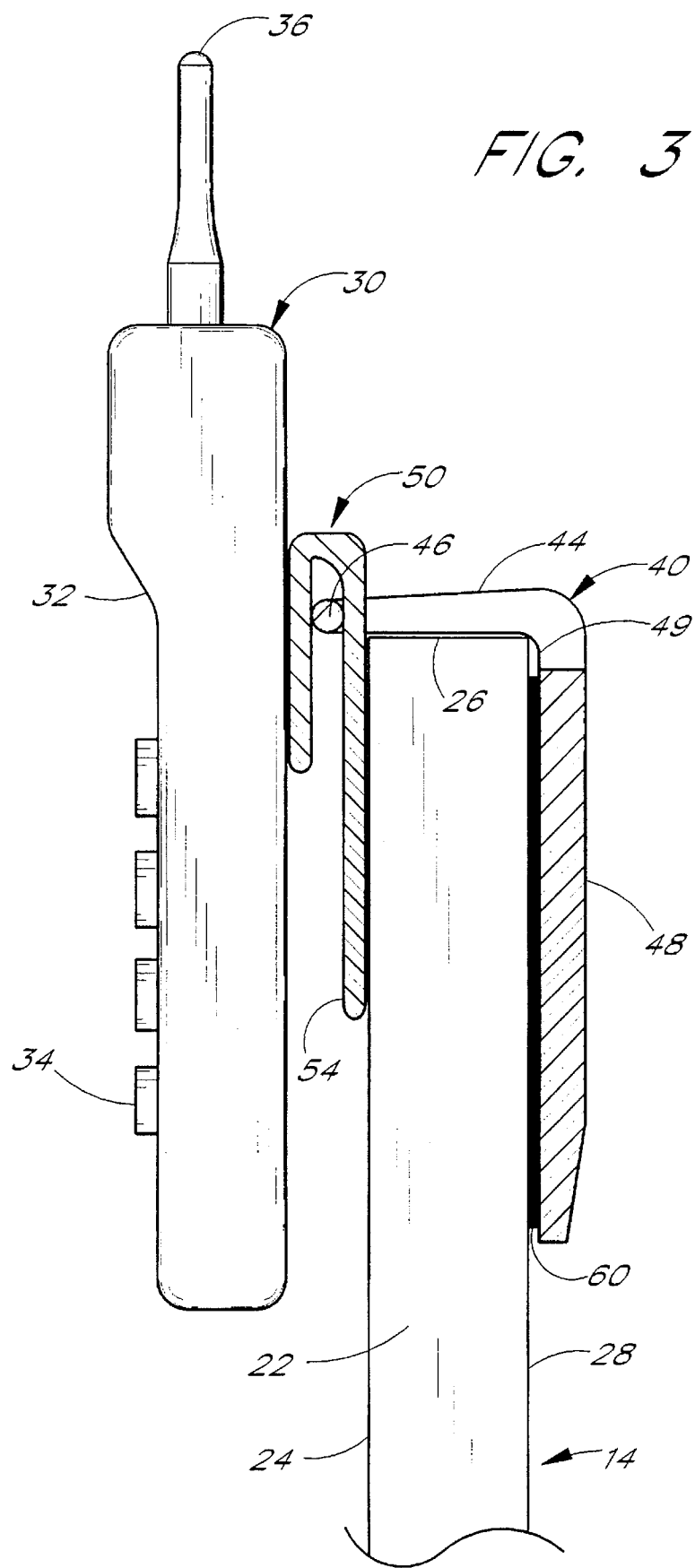
FIG. 3 is a side view of the clip-holder assembly attached to a portable computer and wireless telephone.

FIG. 3 shows the wireless telephone 30 in combination with the lid 14 of the portable computer 10 (FIG. 1). To achieve this combination, the tongue 54 of the clip 50 is inserted into the clip-holder 40. The clip 50 and clip-holder 40 then secure the wireless telephone 30 to the lid 14 of the portable computer 10. The lid 14 is comprised of a screen frame 24, a rear side 28, and an upper side 26. In the preferred embodiment shown in FIG. 3, the clip-holder 40 secures to the rear side 28 of the lid 14 by placing a strip of dual-sided adhesive tape 60 along the inner surface 49 of the rear tongue 48 of the clip-holder 40. Any alternative method of attachment, such as glue, hook and loop fasteners (VELCRO)®, or a strap may be used. The top flange 44 of the clip-holder 40 extends across and slightly beyond the upper side 26 of the lid 14 so the tongue 54 of the clip 50 can be inserted in the opening 42 (FIG. 1) between the front edge 46 of the top flange 44 and the screen frame 24 of the lid 14. When the wireless telephone 30 is attached to the lid 14, the antenna 36 is maintained in essentially the vertical position, while both the display 32 and the controls 34 of the wireless phone 30 are easily accessible to the user.

Alternatively, instead of attaching a clip-holder 40, the lid 14 of the portable computer 10 could include a slot. In this embodiment, the tongue 54 of the clip 50 is inserted into the slot in the lid 14. The slot could be either in the upper side 26, or the side edge 22 of the lid 14. A slot in the side edge 22 of the lid 14 would require mounting the clip 50 on the telephone 30 so the tongue 54 of the clip 50 extends horizontally. Inserting the tongue 54 of the clip 50 horizontally in a side edge 22 slot will maintain the wireless telephone 30 in essentially the vertical position.

Figure 4A:
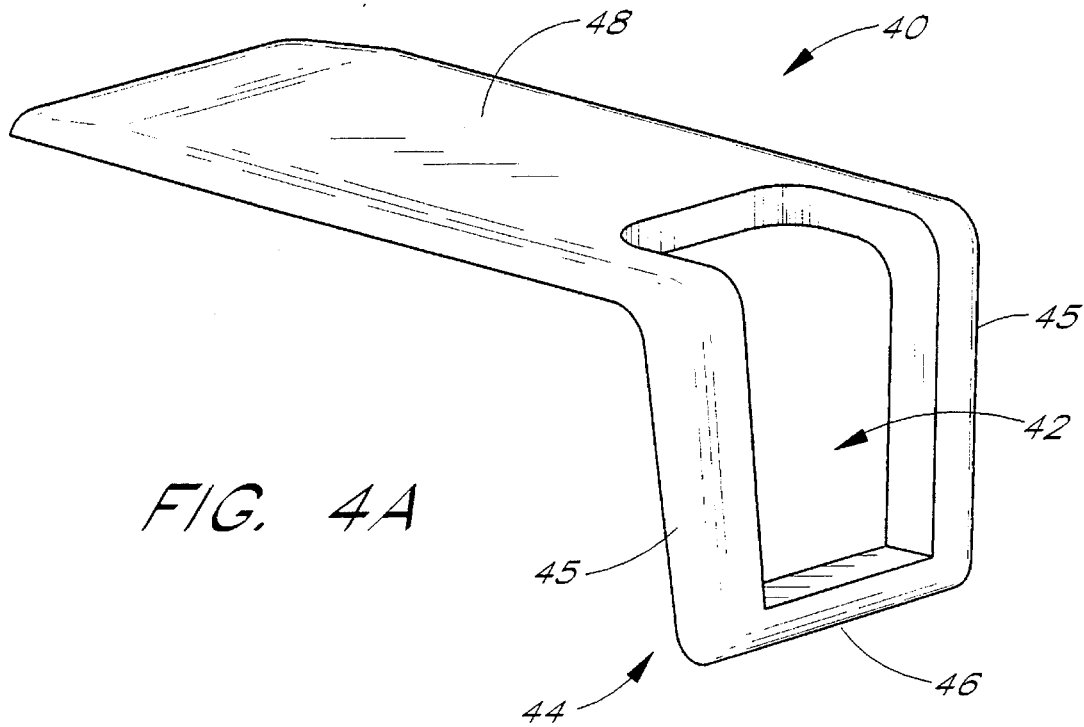
FIG. 4A is a perspective view of one preferred embodiment of the clip-holder of the present invention.

FIG. 4A shows one embodiment of the clip-holder 40. In this design, the top flange 44 contains two flange arms 45 and a front edge 46. The flange arms 45 and front edge 46 define an opening 42. The opening 42 covers a majority of the top flange 44 and extends to a portion of the rear tongue 48. By having a large opening 42, the clip-holder 40 can accommodate a variety of clips. The top flange 44 of the clip-holder 40 forms approximately a right angle with the rear tongue 48. This design allows the clip-holder 40 to follow the contour of the lid 14. The rear tongue 48 of the clip-holder 40 fits proximate the rear wall of the lid 14, while the top flange 44 extends across the upper side 26 of the lid 14. The contoured design of the clip-holder 40 permits a slim design, a desired feature in portable computer systems. To ensure light weight, the clip-holder 40 is made out of plastic, however any material can be used.

Figure 4B:
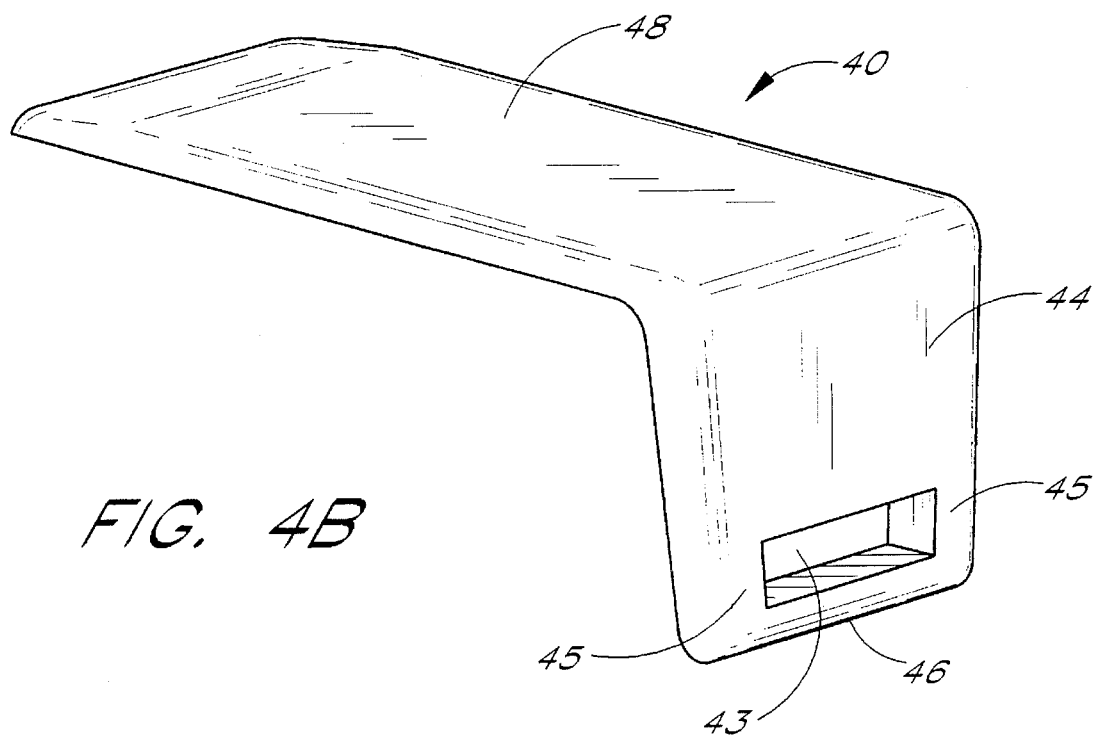
FIG. 4B is a perspective view of an alternative embodiment of the clip-holder of the present invention.

FIG. 4B shows an alternative design of the clip-holder 40 suited for holding wireless telephones attached to The Clip™ and similar clips. In this design, a slot 43 is formed into the top flange 44. The slot 43 is defined on the sides by two flange arms 45, on the front by the front edge 46 of the top flange 44, and at the rear by the body of the top flange 54. The slot 43 is slightly larger than the dimensions of the tongue 54 of The Clip™. When the clip-holder 40 is attached to the lid 14 of a portable computer, the slot 43 extends slightly forward of the display side screen frame 24 of the lid 14. This allows the tongue 54 to be inserted in the slot 43, thereby holding the wireless telephone 30 in the vertical position.

Of course, numerous variations and modifications of the invention will become readily apparent to those skilled in the art. For example, an alternate embodiment of the clip-holder could attach directly to the front of the computer and have a portion that flipped out when the computer lid was opened to provide a slot for mounting the telephone. Accordingly, the scope of the invention should not be construed as limited to the specific embodiment depicted and described but rather, the scope is defined by the appended claims. The invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A computer/phone combination, comprising:

a portable computer having a base and a lid, wherein the lid is opened into a generally vertical orientation while the base remains generally horizontal;

a wireless phone having a front and a back and an antenna, wherein the back of the phone includes a clip which removably mounts to a clip-holder on the lid of said computer so that said phone is supported in an upright manner; and a data transmission line linking said portable computer and said wireless phone.

2. The combination of claim 1 wherein said clip additionally comprises a tongue that fits into an opening in said clip holder.

3. The combination of claim 1 wherein said clip holder has a flange which extends in front of said lid so that the front edge of said flange overlays the base of said computer when said computer is in a closed position.

4. The combination of claim 1, wherein the phone is a cellular phone.

5. The combination of claim 1, wherein the phone is a broad spectrum phone.

6. The combination of claim 1, wherein the phone is a portable household phone.

7. A computer/phone combination, comprising:

a portable computer having a base and a lid, wherein the lid is opened into a generally vertical orientation while the base remains generally horizontal;

a clip-holder mounted to said lid, wherein said clip-holder comprises a flange having a front edge that extends over said base while said computer is in a closed position; and a wireless phone having a front and a back and an antenna, wherein the back of the phone comprises a clip that removably mounts to said clip holder so that said phone is supported in an upright manner when said portable computer is in an open position.

8. The combination of claim 7, wherein the phone is a cellular phone.

9. The combination of claim 7, wherein the phone is a broad spectrum phone.

10. The combination of claim 7, wherein the phone is a portable household phone.

* * * * *